April 24, 1934.   T. A. WHITE   1,956,184
ADJUSTABLE PROPELLER
Filed July 3, 1933   2 Sheets-Sheet 1
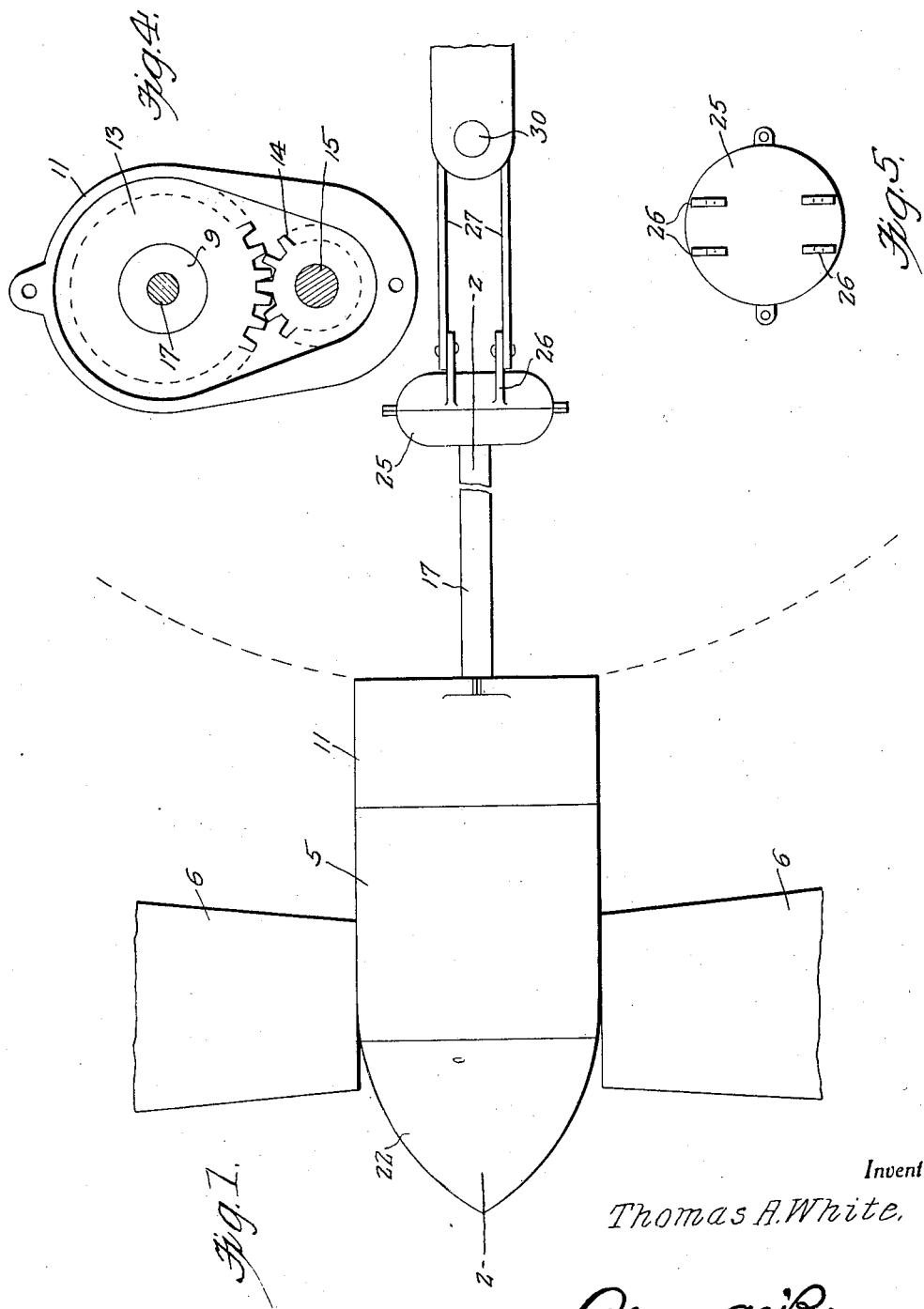
Inventor
Thomas A. White,
By Clarence A. O'Brien
Attorney

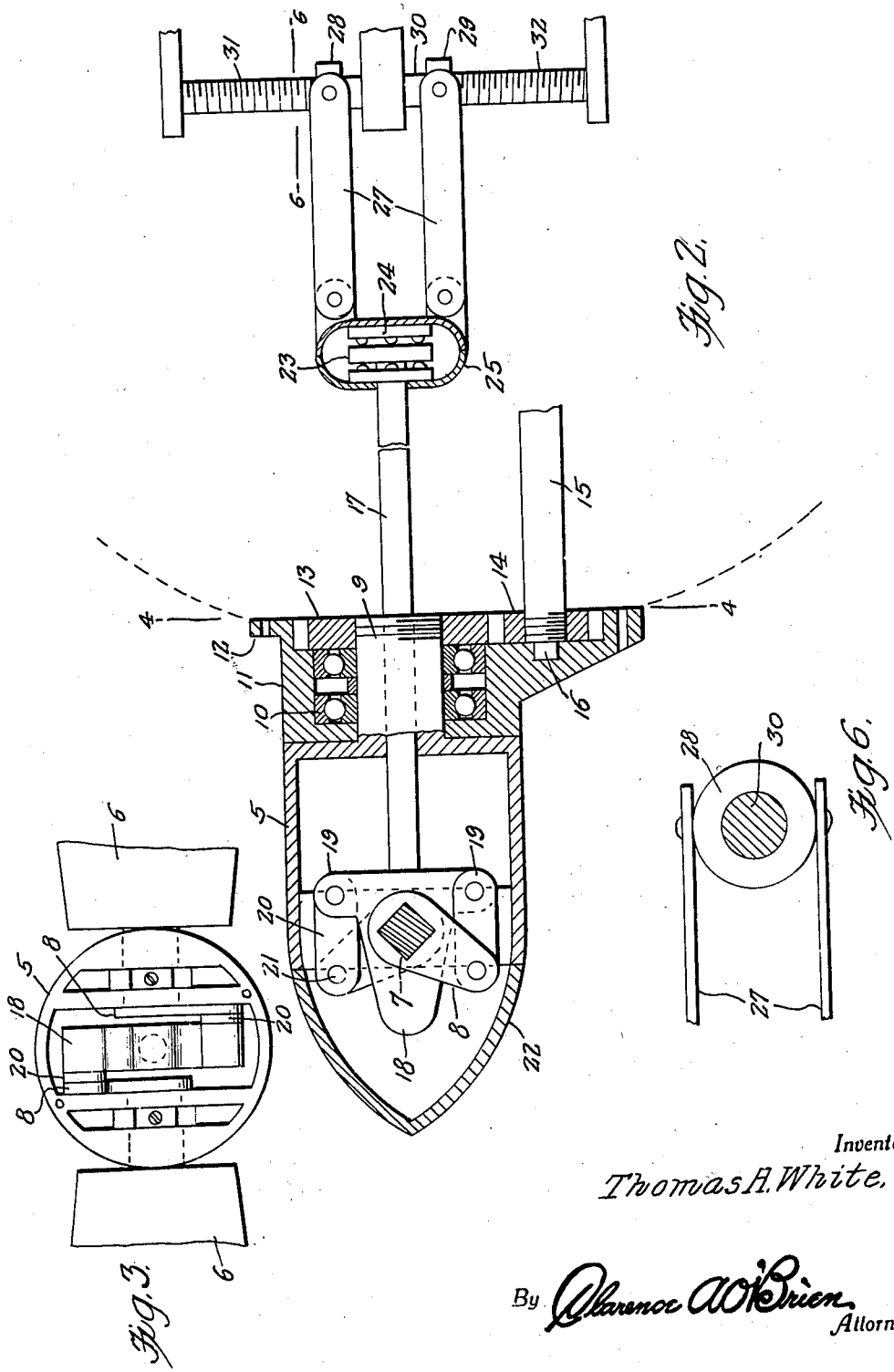

Patented Apr. 24, 1934

1,956,184

UNITED STATES PATENT OFFICE 1,956,184

ADJUSTABLE PROPELLER

Thomas Arthur White, Mansfield, Ohio

Application July 3, 1933, Serial No. 678,945

1 Claim. (Cl. 170—163)

This invention appertains to new and useful means for adjusting aircraft propellers, and more particularly to improvements in means whereby propellers can be adjusted remotely, as by the pilot from his cockpit.

The principal object of the present invention is to provide positive acting means whereby a propeller can be adjusted easily from a distance without involving structure which will weaken the propeller drive.

During the course of the following specification, other important objects and advantages of the invention will become apparent to the reader.

In the drawings:—

Figure 1 represents a top plan view of the novel structure, showing the propeller blades fragmentarily.

Figure 2 represents a longitudinal sectional view through the structure shown in Figure 1, and taken substantially on line 2—2 of Figure 1.

Figure 3 represents a fragmentary front elevational view of the propeller hub with the nose piece removed.

Figure 4 represents a sectional view taken substantially on line 4—4 of Figure 2.

Figure 5 represents a rear side elevational view of the swivel bearing shown in Figure 2.

Figure 6 represents an enlarged fragmentary sectional view taken substantially on line 6—6 of Figure 2.

Referring to the drawings wherein like numerals designate like parts, it can be seen in Figure 2, that numeral 5 represents the propeller hub. Numerals 6—6 represent the propeller blades, the polygonal shaped shanks of which are denoted by numeral 7 and terminate within the hub 5 where they are provided with levers 8. The rear end of the hub 5 is provided with a hollow spindle 9 disposed through the bearings 10 located within the shell 11, which shell is provided with openings 12 in the flanged periphery thereof through which securing means can be disposed for attaching the said shell to the nose portion of the aircraft fuselage.

The rear end of this shell 11 is indented to accommodate the gear wheel 13 which is secured to the rear end of the spindle 9 and in mesh with the pinion 14 carried by the crank shaft 15. This is the power shaft and the same is provided with a bearing extension 16, as shown in Figure 2.

Slidably disposed through the hollow spindle 9 is the elongated rod 17 which, at its forward end, is attached to the block 18, which block is provided with a pair of oppositely directed ears 19—19. To each ear 19 is pivotally connected one end of a link 20, while the opposite end of each link is pivotally connected, as at 21, to its corresponding propeller blade lever 8. A bullet-shaped nose piece 22 is provided as a closure for the forward end of the hub 5. The rear end of the rod 17 is provided with a rotor 23 operating between the ball races 24—24 located within the annular shell 25, which shell is provided with rearwardly extending ears 26 to which the upper and lower pairs of links 27—27 are pivotally connected. These links are connected, one pair to the nut 28 and the other pair to the nut 29, the nuts 28—29 being feedable on the shaft 30 and on the threaded portions 31—32 respectively thereof. These threaded portions are oppositely threaded so that when the shaft 30 is rotated by any suitable or desired means, the nuts 28—29 will separate or contract, depending upon the direction of rotation of the shaft to move rearwardly or forwardly the bearing swivel at the rear end of the rod 17 and consequently the rod 17 which in turn imparts the necessary adjusting movement to the propeller blades 6—6.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

In a propeller, a hollow hub structure, blades fastened to the hub, means in the hub for adjusting said blades, a stationary mounting for the hub, a hollow spindle projecting from the hub and journaled through the mounting, a drive shaft in parallel relation to the spindle and having an end journaled in the mounting, and meshing gears on the spindle and drive shaft, means disposed through the hollow spindle for operating the said adjusting means, the rear side of the mounting being provided with a recess for receiving the said gears.

THOMAS ARTHUR WHITE.